US008425056B2

(12) United States Patent
Sumiyama

(10) Patent No.: US 8,425,056 B2
(45) Date of Patent: Apr. 23, 2013

(54) IMAGE DISPLAY APPARATUS

(75) Inventor: Fumika Sumiyama, Matsumato (JP)

(73) Assignee: Seiko Epson Corporation, Tokyo (JP)

( * ) Notice: Subject to any disclaimer, the term of this patent is extended or adjusted under 35 U.S.C. 154(b) by 477 days.

(21) Appl. No.: 12/721,917

(22) Filed: Mar. 11, 2010

(65) Prior Publication Data

US 2010/0238099 A1 Sep. 23, 2010

(30) Foreign Application Priority Data

Mar. 19, 2009 (JP) ................................. 2009-067691
Feb. 5, 2010 (JP) ................................. 2010-024767

(51) Int. Cl.
*G03B 21/28* (2006.01)

(52) U.S. Cl.
USPC .................. 353/99; 353/31; 353/34; 353/38; 353/37; 353/98; 349/9; 359/196.1

(58) Field of Classification Search .................... 353/20, 353/30, 31, 33, 34, 81, 82, 98, 99, 37, 119, 353/122; 349/5, 7, 8, 9; 372/9, 22, 13, 92, 372/98, 27, 37, 99, 106, 12, 105, 87, 26; 359/196.1, 197.1, 199.1, 200.8, 489.01, 489.02, 359/246, 256, 259
See application file for complete search history.

(56) References Cited

U.S. PATENT DOCUMENTS

| | | | | |
|---|---|---|---|---|
| 4,649,544 | A * | 3/1987 | Haas et al. | 378/22 |
| 5,430,748 | A * | 7/1995 | MacCormack et al. | 372/29.016 |
| 6,345,895 | B1 * | 2/2002 | Maki et al. | 353/33 |
| 6,594,090 | B2 * | 7/2003 | Kruschwitz et al. | 359/707 |
| 6,707,595 | B2 * | 3/2004 | Kutz et al. | 359/291 |
| 6,795,221 | B1 * | 9/2004 | Urey | 359/199.1 |
| 7,414,786 | B2 * | 8/2008 | Brown et al. | 359/490.01 |
| 7,599,069 | B2 * | 10/2009 | Toussaint et al. | 356/491 |
| 7,748,853 | B2 * | 7/2010 | Yamauchi | 353/97 |
| 8,014,069 | B2 * | 9/2011 | Spilman et al. | 359/489.01 |
| 2009/0190098 | A1 * | 7/2009 | DeJong et al. | 353/20 |

FOREIGN PATENT DOCUMENTS

| | | |
|---|---|---|
| JP | A-2006-48807 | 2/2006 |
| JP | A-2008-216641 | 9/2008 |

OTHER PUBLICATIONS

Kozawa et al., "Generating Method and Converging Characteristics of Axially Symmetric Polarized Beam," *Kogaku Optics*, (2006), pp. 625-633, vol. 35 (with abstract and translation).

* cited by examiner

*Primary Examiner* — Georgia Y Epps
*Assistant Examiner* — Sultan Chowdhury
(74) *Attorney, Agent, or Firm* — Oliff & Berridge, PLC

(57) ABSTRACT

An image display apparatus includes: a light source unit which emits axially symmetric polarized light having polarization distribution symmetric with respect to the center axis of light; and a scanning unit which applies the axially symmetric polarized light to a projection surface for scanning to form an image.

19 Claims, 7 Drawing Sheets

IMAGE DISPLAY APPARATUS

BACKGROUND

1. Technical Field

The present invention relates to an image display apparatus.

2. Related Art

Recently, utilization of a laser beam source as a high-output light source has been expected with development of a high-output semiconductor laser and a blue semiconductor laser. The laser beam source has advantages such as excellent color reproducibility, easy and instant lighting, and long life. Laser beams generally used are beams having equalized phase and high coherence (highly coherent beams), and having uniform polarization directions on the cross section perpendicular to the center axis of the beams (oscillation directions of the electric fields of the beams) such as linear polarized lights and circular polarized lights.

On the other hand, laser beams having non-uniform polarization directions different from known laser beams having uniform polarization directions described above are attracting attention. The laser beams having non-uniform polarization directions are vector beams, for example.

The vector beams are axially symmetric polarized lights having spatial polarization distribution. It is known that the vector beams have various types of polarization oscillation conditions (modes) in accordance with solutions for formulas expressing the vector beams. For example, primary vector beams are known as axially symmetric polarized laser beams having "optical vortex" as a point of zero optical field intensity at the center of the center axis of the beams. In recent years, the method for producing the vector beams has been widely investigated so as to effectively utilize the special polarization characteristics of the vector beams (for example, see JP-A-2008-216641). For example, a method for utilizing the vector beams as a light source of an optical memory device has been proposed (for example, see JP-A-2006-48807).

Since application and development aimed at utilization of laser beams having uniform polarization directions have been chiefly studied, most of technologies currently used are assumed to use laser beams having uniform polarization directions. Thus, utilization of laser beams having non-uniform polarization directions such as vector beams is not sufficiently developed, and application of this type of laser beams capable of providing characteristics different from those of the laser beams traditionally used is expected.

In addition, a projector (image display apparatus) including a laser beam source has been developed in recent years. This type of projector having a narrow wavelength range of the laser beam source can provide a sufficiently wide color reproducibility range, and thus can reduce the size of the apparatus and the number of included components. Accordingly, the projector including the laser beam source has the high potential of playing a role as a projector for the next generation.

However, in case of the projector which uses the laser beams having uniform polarization directions for display, a phenomenon called speckles occurs in some cases. When the speckle phenomenon is caused, bright points and dark points are distributed in a striped pattern or a spot pattern due to light coherence caused by a scattering body such as a screen.

Speckles are regarded as a factor causing adverse effects such as scintillating effect, and thus make an observer uncomfortable during observation of image display. Since the laser beams having uniform polarization directions have high coherence and easily produce speckles, an appropriate technology for removing speckles is essential for using these laser beams as the light source.

For reducing speckles, such a method is known which produces plural patterns of speckles by using lights having low coherence (incoherent lights) such as lights having slightly different wavelengths, and overlaps the plural speckles at a time to make the patterns of the speckles unrecognizable. This method overlaps speckles produced by two types of polarized lights and equalizes the speckles to reduce the speckle phenomenon.

In case of an image display apparatus including a self-light-emission-type display element, however, light emitted from the display element forms an image as pixels of a display image on a screen, and thus lights emitted from plural light sources of the display element do not overlap with one another. Accordingly, in case of the image display apparatus which includes the self-light-emission-type display element and uses the ordinary laser beams, speckle reduction cannot be sufficiently achieved even when the laser beams emitted from the plural light sources have low coherence between one another.

SUMMARY

It is an advantage of some aspects of the invention to provide an image display apparatus capable of reducing speckles by using laser beams having non-uniform polarization directions.

Examples of an image display apparatus according to aspects of the invention include the following two general configurations. An image display apparatus according to a first aspect of the invention includes: a light source unit which emits axially symmetric polarized light having polarization distribution symmetric with respect to the center axis of light; and a scanning unit which applies the axially symmetric polarized light to a projection surface for scanning to form an image.

An image display apparatus according to a second aspect of the invention includes: a plurality of light source units each of which emits axially symmetric polarized light having polarization distribution symmetric with respect to the center axis of light. In this case, the light source units are disposed in two-dimensional matrix in correspondence with pixels forming an image to be displayed to form the image on a projection surface by using the axially symmetric polarized light.

The image display apparatus according to the first aspect does not require an image forming unit corresponding to the shape of the image. Thus, the system structure can be made compact. The image display apparatus according to the second aspect has no movable portion and thus is not easily damaged. Accordingly, the reliability of the image display apparatus improves.

In addition, each of the image display apparatuses having these structures uses the axially symmetric polarized light for image formation, and thus can securely reduce speckles. The axially symmetric polarized light is light whose polarization component directions are not one-sided but diversified in multiple on a plane perpendicular to the center axis of the light. In this case, various speckle patterns are produced on the projection surface when the axially symmetric polarized light is applied thereto. Thus, the plural speckle patterns can be overlapped and equalized even without staking of lights emitted from plural light sources of a display element, and thus can be recognized as uniform light by an observer. Accordingly, the image display apparatus can securely achieve reduction of speckles.

It is preferable that the light source unit includes a laser beam source which emits a laser beam, and a polarized light forming unit disposed on the optical path of the laser beam to convert the laser beam into the axially symmetric polarized light.

According to this structure, the advantages of the invention can be achieved without using a light source having special structure.

It is preferable that the polarized light forming unit is a liquid crystal modulation element having a liquid crystal layer sandwiched between a pair of substrates, and that an orientation regulating force for orienting liquid crystal molecules of the liquid crystal layer in a concentric shape is given to the surfaces of the pair of the substrates facing the liquid crystal layer.

According to this structure, the axially symmetric polarized light can be produced by utilizing optical activity of liquid crystal molecules. Moreover, whether the axially symmetric polarized light is generated or not can be determined by controlling the polarized light forming unit. Thus, when speckles are not very conspicuous in such images as dark images and images chiefly containing blue as a color of low visibility during display, time-sharing actuation of the polarized light forming unit is performed to reduce loss of lights produced by the polarized light forming unit and increase the use efficiency of the lights.

It is preferable that the polarized light forming unit is an optical fiber having LP11 mode as a propagation mode.

According to this structure, the axially symmetric polarized light is produced by the optical fiber, and beams can be directed to an arbitrary position by the optical fiber. Thus, the degree of freedom in designing the optical systems increases.

It is preferable that the polarized light forming unit is a retardation film, and that the retardation film has a first area which converts the polarization direction of the laser beam into a first direction and a second area which converts the polarization direction of the laser beam into a second direction different from the first direction within a beam spot of the applied laser beam.

According to this structure, no movable portion is provided. Thus, the image display apparatus is highly reliable.

It is preferable that the polarized light forming unit includes a branching unit which branches the laser beam into first separation light and second separation light, a light combining unit which combines the first separation light and the second separation light into one combined light, and a polarization element disposed at least either on the optical path of the first separation light or on the optical path of the second separation light and making the polarization directions of the first separation light and the second separation light different from each other.

According to this structure, the polarization components of the combined light corresponding to the electric field oscillation direction are diversified in multiple directions. Thus, various speckle patterns produced by the respective polarization components stack on the retinas of the observer with further complication. Thus, the image display apparatus can achieve reduction of speckles.

It is preferable that the image display apparatus further includes an expanding optical system on the optical path between the laser beam source and the polarized light forming unit.

According to this structure, the expanded laser beam enters the polarized light forming unit. Thus, the necessity for miniaturizing the polarized light forming unit is eliminated, and thus loads imposed when manufacturing the elements can be reduced.

It is preferable that the light source unit includes a light emission unit which emits light, an external resonator which reflects a part of the light emitted from the light emission unit toward the light emission unit, and a polarized light forming unit disposed on the optical path between the light emission unit and the external resonator to convert the entering light into the axially symmetric polarized light.

According to this structure, the light source unit emits the axially symmetric light amplified by the resonance structure. Thus, loss of light caused in producing the axially symmetric polarized light need not be considered.

It is preferable that the light source unit includes a light emission unit which emits light, and an external resonator which reflects a part of the light emitted from the light emission unit toward the light emission unit. In this case, the external resonator is a grating mirror which converts the entering light into the axially symmetric polarized light and reflects the converted light.

According to this structure, the external resonator and the polarized light forming unit are combined into one unit. Thus, the system structure can be made compact, and the external resonator and the polarized light forming unit can be simultaneously aligned. Accordingly, system assembly can be facilitated.

It is preferable that a unit of the light source unit is provided. In this case, a laser light source is provided to supply a laser beam having a color different from the color of the axially symmetric polarized light emitted from the light source unit. A color combining optical system is provided to combine the axially symmetric polarized light and the laser beam having the different color. The axially symmetric polarized light is a color light having higher visibility than that of the laser beam having the different color.

According to this structure, speckle reduction is individually performed for the color light for which speckle reduction is most effective. In this case, only the smallest number of the polarized light forming unit is required. Thus, the structure of the image display apparatus can be simplified and made compact with speckles reduced.

It is preferable that plural units of the light source unit are provided to supply the plural axially symmetric polarized lights having colors different from each other, and that a color combining optical system is provided to combine the plural axially symmetric polarized lights having colors different from each other.

According to this structure, speckles can be further effectively reduced.

It is preferable that a plurality of laser beam sources are provided to supply plural types of laser beams having colors different from each other. In this case, a color combining optical system is provided to combine the plural types of laser beams having colors different from each other. The polarized light forming unit is disposed on the optical path of the combined laser beam supplied from the color combining optical system.

According to this structure, the number of the polarized light forming unit can be decreased. Thus, the structure of the image display apparatus can be simplified and made compact with speckles reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

An image display apparatus according to a first embodiment of the invention is hereinafter described with reference to FIG. 1 and FIGS. 2A through 2E. In all of the figures referred to in this specification, the thicknesses, the dimension ratios, and other conditions of respective components are varied as necessary for easy understanding of the figures.

Figure 1:
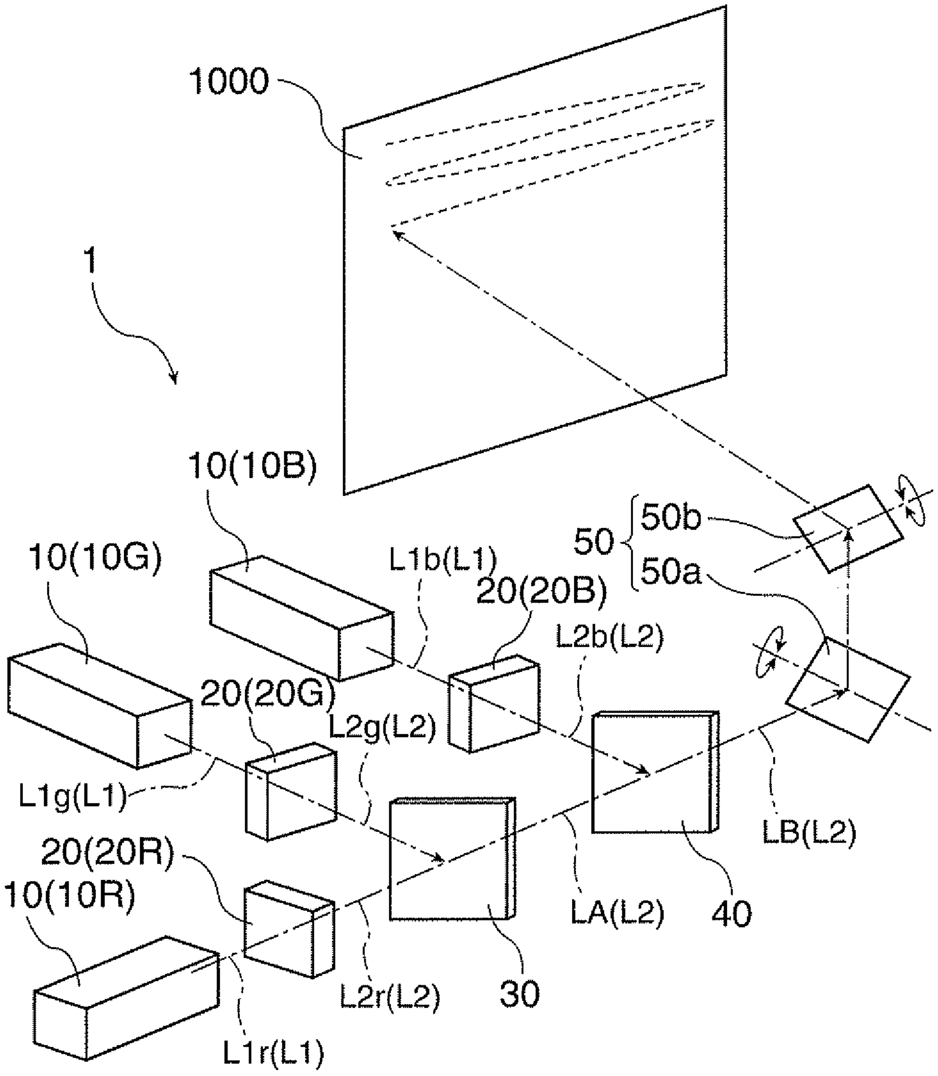
FIG. 1 is a perspective view schematically illustrating an image display apparatus according to a first embodiment of the invention.

FIG. 1 is a perspective view schematically illustrating a projector (image display apparatus) according to this embodiment. As illustrated in the figure, the projector 1 includes laser beam sources 10 (10R, 10G, and 10B) which emit laser beams, dichroic mirrors (color combining units) 30 and 40 each of which combines lights emitted from the respective laser beams 10 into one light, and a scanning optical system (scanning unit) 50 which applies laser beams to a screen (projection surface) 1000 for scanning and forms an image.

The projector 1 further includes vector beam forming elements (polarized light forming unit) 20 which receive laser beams L1 emitted from the respective laser beam sources 10 and convert the laser beams L1 into vector beams L2 as axially symmetric polarized beams on the optical paths between the laser beam sources 10 and the dichroic mirrors 30 and 40. The details of the vector beams will be described later.

The respective components included in the projector 1 are now explained.

The laser beam sources 10 whose detailed structure is not shown include a red laser beam source 10R having a semiconductor laser element for emitting red light (emission light) L1*r*, a green laser beam source 10G having a semiconductor laser element for emitting green light (emission light) L1*g*, and a blue laser beam source 10B having a semiconductor laser element for emitting blue light (emission light) L1*b*. The respective emission lights L1*r*, L1*g*, and L1*b* are coherent lights having high coherence, and emitted as substantially perfect plane waves.

The emission lights L1*r*, L1*g*, and L1*b* enter the vector beam forming elements 20 to be converted into the vector beams L2 as axially symmetric polarized beams. The vector beams are axially symmetric polarized laser beams having "optical vortex" as a point of zero optical field intensity in the vicinity of the center axis of the beams, and have characteristics such as spiral equiphase plane and doughnut-shaped beam intensity distribution. The vector beam forming elements 20 are provided for each of the laser beam sources 10 to convert the entering red light L1*r*, green light L1*g*, and blue light L1*b* into red light L2*r*, green light L2*g*, and blue light L2*b* as the vector beams L2 and supply the converted lights L2*r*, L2*g*, and L2*b*.

The material for constituting the vector beam forming elements 20 can be selected according to the mode of the laser beams L1 ("Jikutaisho henko bimu no hasseiho to shuko tokusei (Generating method and converging characteristics of axially symmetric polarized beam)", Kogaku (Optics), 35 (2006), 625-634, written by Kozawa and Sato).

More specifically, the vector beam forming elements 20 can be constituted by liquid crystal modulation elements each of which has liquid crystals sandwiched between a pair of substrates, for example. In this case, a force for regulating orientations of liquid crystal molecules in one direction and in a concentric shape is applied to the inner surfaces of the substrates (surfaces opposed to the liquid crystals). The direction of the orientation regulating force can be determined by rubbing a polyimide film formed on the inner surfaces of the substrates, for example. The liquid crystal molecules are oriented in the direction of the orientation regulating force (orientation direction) on a liquid crystal layer sandwiched between the substrates, and arranged in a concentric shape.

The vector beam forming elements 20 having this structure can determine whether axially symmetric polarized lights are generated or not by controlling the orientation directions of the liquid crystals according to ON and OFF of the liquid crystal modulation elements. Thus, when speckles are not very conspicuous in such images as dark images and images chiefly containing blue as a color of low visibility during display, time-sharing actuation of the vector beam forming elements 20 is performed to reduce loss of lights produced by the vector beam forming elements 20 and increase the use efficiency of the lights.

Alternatively, optical fibers having LP11 mode as a propagation mode may be used as the vector beam forming elements 20. The vector beam forming elements 20 having this structure can direct beams to an arbitrary position through optical fibers. Thus, the degree of freedom in designing the optical systems increases.

Furthermore, retardation films may be used as the vector beam forming elements 20. For example, the retardation films used for this purpose have a plurality of divided areas around the center axis of the laser beams L1 to change the polarization directions of the laser beams L1 passing the respective areas such that the polarization directions of the beams L1 can be bended at different angles or converted into directions of circular polarized lights.

The laser beams entering the retardation films having this structure pass through the respective areas to be converted into vector beams as a collection of linear polarized lights having different polarization directions or circular polarized lights. Since the vector beam forming elements 20 have no movable portion, the projector 1 including these vector beam forming elements 20 becomes an image display apparatus less susceptible to breakdown and highly reliable.

Other examples of the material for constituting the vector beam forming elements 20 involve a cone-shaped prism (axicon prism) which has a dielectric multilayer film on a light entrance surface having angle satisfying Brewster condition, a double-reflection material having concentric patterns, a photonic crystal, a phase hologram, a spatial light modulators and the like. Each of the vector beam forming elements 20*r*, 20*g*, and 20*b* may be different types or the same type.

FIGS. 2A through 2E illustrate the vector beams L2 produced by the vector beam forming elements 20 in FIG. 1, showing polarization distributions on planes perpendicular to the center axis of the beams. Arrows in the figures indicate polarization components contained in the vector beams L2. Symbols LP indicate linear polarized lights, and symbols CP indicate circular polarized lights. Double arrows given to each of the linear polarized lights LP show the oscillation direction of the corresponding polarized light, and a single arrow given to each of the circular polarized lights CP shows the rotation direction of the corresponding circular polarized light. An optical vortex LV is produced at the center of the vector beams L2.

The "vector beam" herein refers to light having uniform phase and non-uniform polarization distribution (polarization direction). The name "vector beam" comes from the fact that vector is used in a formula expressing electric field instead of scalar used in case of ordinary laser beam. Thus, all beams having non-uniform polarization distributions become vector beams. However, since only axially symmetric polarized lights having a polarization singular point on the optical axis (lights having polarization distribution symmetric with respect to the center axis of the lights) currently exist, "vector beam" corresponds to "axially symmetric polarized light" in this specification. Even when the polarization distribution is almost symmetric with respect to the axis or non-uniform, the desired advantage of speckle reduction can be provided.

As shown in the figures, various conditions of the vector beams L2 converted by the vector beam forming elements 20 exist according to combinations of the mode of the laser beams L1 emitted from the laser beam sources and the selected types of the vector beam forming elements 20. The vector beams in any modes can be appropriately used.

Figure 2A:
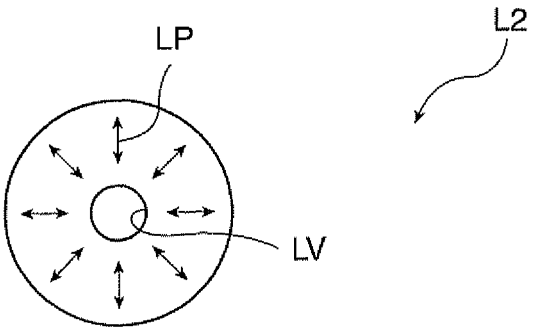
FIGS. 2A through 2E illustrate laser beams produced by a polarized light forming unit according to the invention.
Figure 2B:
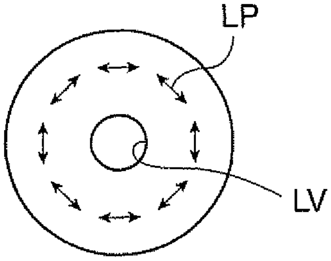
Figure 2C:
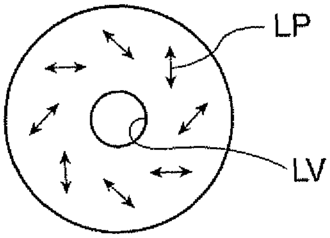
Figure 2D:
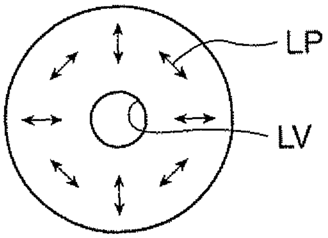

For example, the vector beam forming elements 20 may produce lights of radial polarization having linear polarization LP components whose oscillation directions are radial as shown in FIG. 2A, lights of azimuthal polarization (azimuth polarization) having linear polarization LP components whose oscillation directions are circumferential directions as shown in FIG. 2B, lights of polarization (spiral polarization) having linear polarization LP components whose oscillation directions correspond to intermediate directions between radial polarization and azimuthal polarization as shown in FIG. 2C.

Figure 2E:
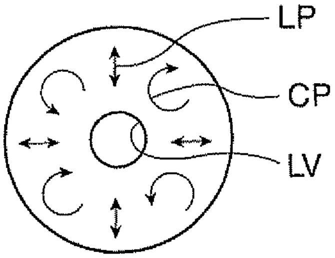

Furthermore, the vector beam forming elements 20 may provide a mode in which produced polarized lights contain linear polarization LP components having different two types of oscillation directions of radial direction and circumferential direction and alternately repeat the respective polarization components (FIG. 2D), and a mode in which produced polarized lights contain two types of polarization components of the linear polarized lights LP oscillating in the radial direction and the circular polarized lights CP and alternately repeat the respective polarization components (FIG. 2E).

Returning to FIG. 1, the vector beams L2 in respective colors supplied from the vector beam forming elements 20 are combined into combined light LB by the dichroic mirrors 30 and 40.

The dichroic mirror 30 has a mirror surface which reflects the green light L2*g* and transmits the red light Lr2 as light having longer wavelength than that of the green light L2*g*. The red light L2*r* and the green light L2*g* are selectively reflected or transmitted by the mirror surface to be released toward the same side (toward the scanning optical system 50). By this method, the two emission lights are combined into combined light LA.

The dichroic mirror 40 has a mirror surface which reflects the blue light L2*b* and transmits the combined light LA of the green light L2*g* and the red light L2*r* each of which has longer wavelength than that of the blue light L2*b*. The combined light LA and the blue light L2*b* are selectively reflected or transmitted by the mirror surface to be released toward the same side (toward the scanning optical system 50). By this method, the combined light LB is produced. The combined light LB enters the scanning optical system 50 disposed in the light emission direction.

The scanning optical system 50 includes a first deflecting mirror 50*a* which changes the direction of the center axis of the combined light LB to a sub scanning direction on the surface of the screen 1000, and a second deflecting mirror 50*b* which changes the direction of the center axis of the combined light LB to a main scanning direction on the surface of the screen 1000. For example, the main scanning direction is the horizontal direction of the screen 1000, and the sub scanning direction is the vertical direction perpendicular to the horizontal direction of the screen 1000.

The first deflecting mirror 50*a* of the scanning system 50 is constituted by a micro mechanical mirror produced by MEMS technology or the like, and the second deflecting mirror 50*b* is constituted by a galvano mirror, for example. While the figure shows an example of the scanning optical system 50 including the two mirrors, an MEMS mirror capable of performing two-dimensional scanning by one mirror having two drive axes, for example. The scanning optical system 50 applies the combined light LB in the main scanning direction and the sub scanning direction for scanning to form a display image.

It is possible to provide a collimating optical system and a relay optical system on the optical path from the laser beam sources 10 to the scanning optical system 50. In this case, each of the collimating optical system and the relay optical system may include either one lens or plural lenses.

The projector 1 having this structure reduces speckles by the following method.

Speckles are chiefly produced when coherent light is applied to a light receiving surface having concaves and convexes. Assuming that laser beams as coherent lights are applied to a screen, the laser beams applied to the screen reach the retinas of the observer after scattered by concaves and convexes on the screen surface.

In this case, the concaves and convexes of the screen have sufficiently large amplitude for the wavelengths of the laser beams, and thus give random phase modulation from $-\pi$ to $\pi$ to the laser beams. In forming an image on the retinas, the laser beams having received the random phase modulation interfere with one another and produce interference fringes having extremely high contrast. These interference fringes are called speckles and observed as problems.

On the other hand, the projector 1 in this embodiment displays images by using the vector beams L2 converted by the vector beam forming elements 20. Since the vector beams L2 contain polarization components having various oscillation directions as described above, various types of speckle patterns corresponding to the respective polarization components are formed on the surface of the screen 1000. The speckle patterns thus produced are overlapped on the retinas of the observer and thus equalized thereon. As a result, the speckle patterns become unrecognizable for the observer, and thus reduction of speckles on the displayed image can be achieved.

Accordingly, the projector 1 having this structure can reduce speckles and display images of high quality.

According to this embodiment, the vector beam forming elements produce axially symmetric polarized lights having optical vortex in the vicinity of the center axis of the lights. However, the speckle reducing effect can be provided even when the polarization distribution is almost symmetric with respect to the axis or is non-uniform. The condition "almost symmetric with respect to the axis" refers to a condition in which polarization distribution as axially symmetric distribution with respect to the center axis of lights has unclear boundaries between respective local areas and thus is not symmetric around the boundaries when attention is paid to the polarization distribution in the local areas, for example.

According to this embodiment, the vector beam forming elements 20 are provided for all of the laser beam sources 10R, 10G, and 10B. However, the laser beam forming elements 20 for some of the laser beam sources may be eliminated. In this case, speckles recognizable for the observer can be efficiently reduced by providing only the vector beam forming element 20G corresponding to the laser beam source 10G emitting green laser beams as color light sensed by human eyes most intensely.

Second Embodiment

Figure 3:
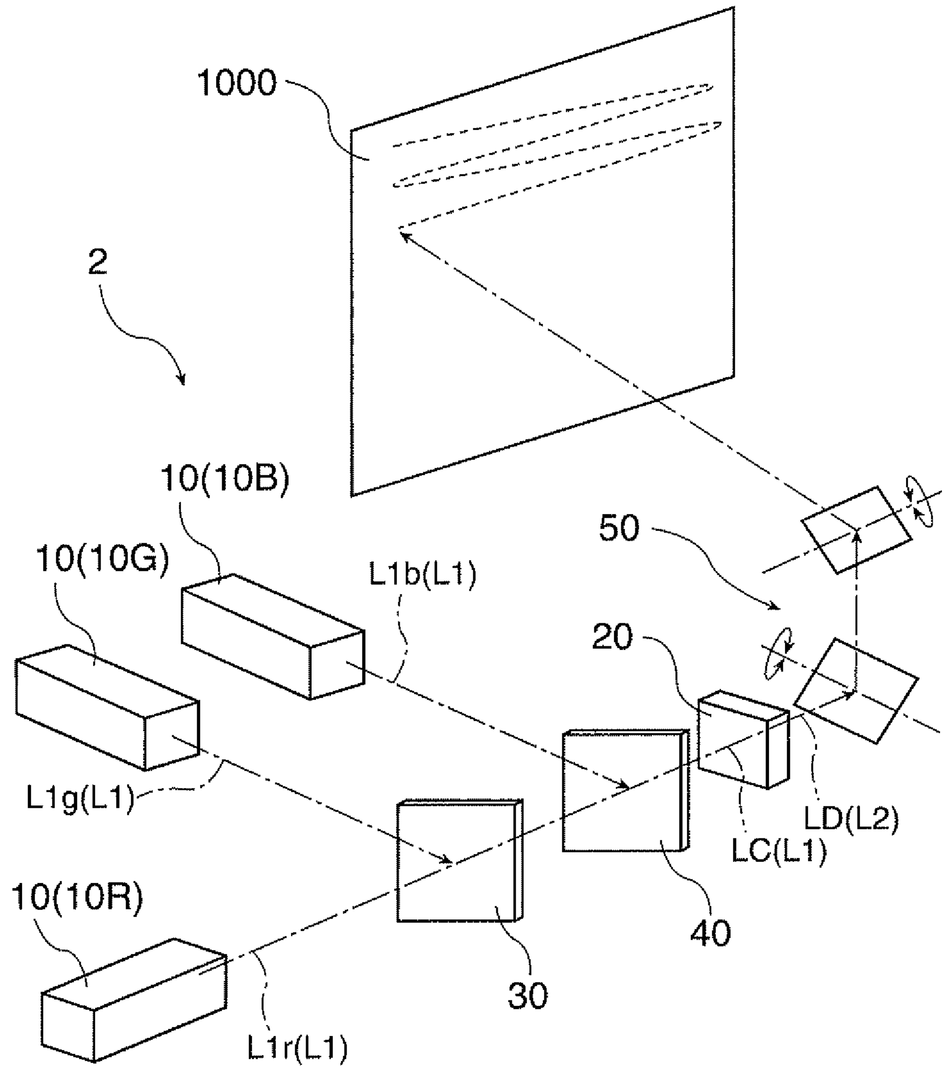
FIG. 3 is a perspective view schematically illustrating an image display apparatus according to a second embodiment of the invention.

FIG. 3 illustrates a projector 2 according to a second embodiment of the invention. The structure of the projector 2 in this embodiment is partially similar to that of the projector 1 in the first embodiment, but is different from the projector 1 in that the vector beam forming element is disposed on the side where combining of the three color laser beams in red, green, and blue is completed. Thus, similar reference numbers are given to parts and elements common to those in the first embodiment, and the same detailed explanation is not repeated.

As illustrated in the figure, the vector beam forming element 20 of the projector 2 is disposed between the dichroic mirror 40 and the scanning optical system 50 on the optical path of combined light LC produced by combining the three color emission lights of L1*r*, L1*g*, and L1*b* in red, green, and blue emitted from the laser beam sources. The combined light LC is combined light of three types of laser beams as coherent light having high coherence. The combined light LC enters the vector beam forming element 20 to be converted into combined light LD as vector beams and supplied to the scanning optical system 50.

According to the projector 2 having this structure, the number of the vector beam forming elements 20 can be reduced. Thus, the structure of the projector 2 can be simplified and made compact with speckles reduced.

Third Embodiment

Figure 4:
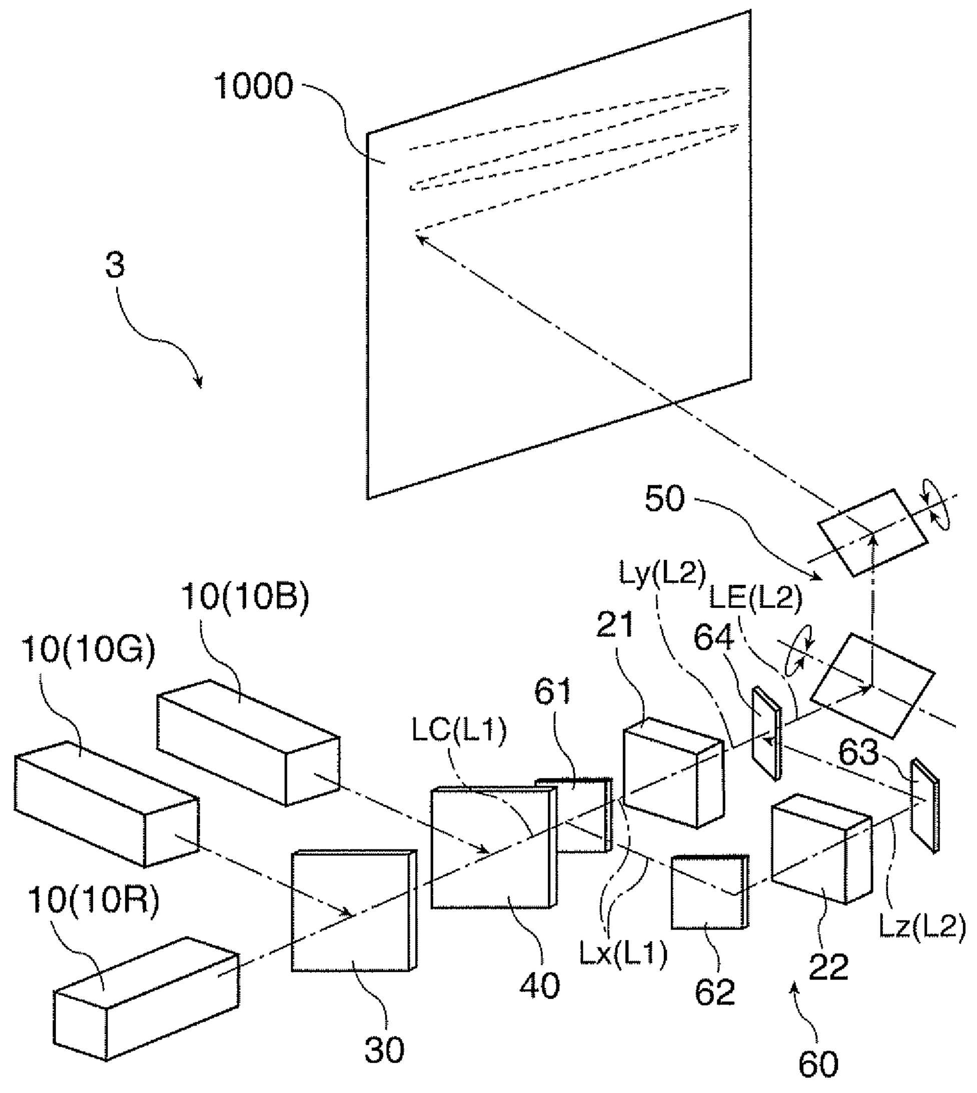
FIG. 4 is a perspective view schematically illustrating an image display apparatus according to a third embodiment of the invention.

FIG. 4 illustrates a projector 3 according to a third embodiment of the invention. The structure of the projector 3 in this embodiment is partially similar to those of the projectors 1 and 2 in the first and second embodiments, but is different from the projectors 1 and 2 in that the combined light of the three color laser beams in red, green, and blue is again branched into two parts, each of which parts is then converted into vector beams and re-combined. Thus, similar reference numbers are given to parts and elements common to those in the first embodiment, and the same detailed explanation is not repeated.

The combined light LC having passed the dichroic mirror 40 enters a half mirror 61 as a beam splitter disposed on the optical path to be branched into two separation lights Lx. Both of the two separation lights Lx branched from the combined light LC as coherent light become coherent lights.

One of the separation lights Lx enters a vector beam forming element 21 disposed on the optical path to be converted into converted light Ly as vector beams. The other separation light Lx enters a vector beam forming element 22 via a reflection mirror 62 to be converted into converted light Lz as vector beams. The vector beam forming elements 21 and 22 are constituted by materials similar to those of the vector beam forming elements 20 described above.

In this case, it is preferable that the materials of the vector beam forming elements 21 and 22 are so selected that the modes of the converted lights Ly and Lz provide polarization distributions different from each other. In this embodiment, the vector beam forming elements 21 and 22 are so selected that the converted light Ly is in the mode shown in FIG. 2A and that the converted light Lz is in the mode shown in FIG. 2B.

The converted lights Ly and Lz converted by the vector beam forming elements 21 and 22 enter a half mirror 64 directly or via a reflection mirror 63 to be combined into combined light LE, and is supplied from the half mirror 64. The half mirror 61, the reflection mirror 62, the vector beam forming elements 21 and 22, the reflection mirror 63, and the half mirror 64 constitute a polarized light forming section 60 (polarized light forming unit).

According to this embodiment, the combined light LE has polarization distribution as the overlapped modes shown in FIGS. 2A and 2B, in which polarization components cross each other at right angles at respective positions in the beams. Thus, complicated speckle patterns are formed in accordance with the respective polarization components and overlapped with one another. As a result, reduction of speckles can be achieved.

The projector 3 in this embodiment is structured as described above.

Accordingly, the projector 3 in this embodiment can effectively reduce speckles.

According to this embodiment, the two converted lights Ly and Lz are combined into the one combined light LE by using the half mirror 64. However, the converted lights Ly and Lz can be combined by introducing the converted lights Ly and Lz into small-radius wave guide paths (fibers), for example, to bend the optical paths of the converted lights Ly and Lz and release the converted lights Ly and Lz in the same direction (toward the scanning optical system 50) from the same position.

Fourth Embodiment

Figure 5:
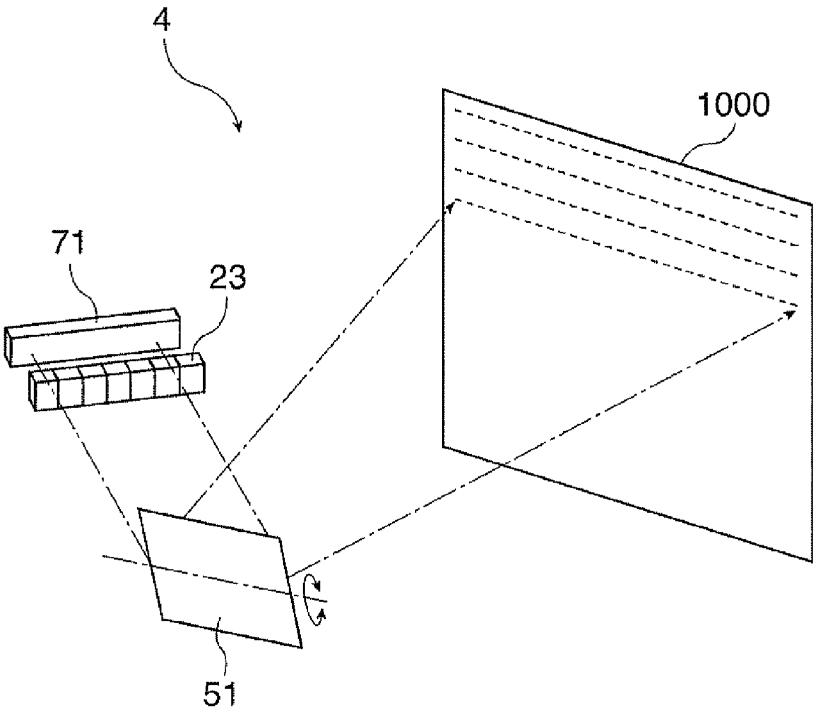
FIG. 5 is a perspective view schematically illustrating an image display apparatus according to a fourth embodiment of the invention.

FIG. 5 illustrates a projector 4 according to a fourth embodiment of the invention. While the scanning-type projector for forming a projection image by two-dimensional scanning on the projection surface has been discussed in the first through third embodiments, the projector 4 in this embodiment has an image forming unit 71 containing light source units disposed in one direction for emitting vector beams, and displays an image by applying the beams emitted from the image forming unit 71 to the screen for scanning. The projector 4 is now explained.

The projector 4 includes the image forming unit 71 having laser beam sources disposed in one direction to emit laser beams, a vector beam forming unit 23 for converting the laser beams into vector beams, and a scanning optical system 51 for forming an image by applying the vector beams received from the vector beam forming unit 23 to the screen 1000 for scanning.

The laser beams emitted from the plural laser beams sources of the image forming unit 71 enter the vector beam forming unit 23 to be converted into vector beams as axially symmetric polarized beams. The vector beam forming unit 23 may be constituted by the vector beam forming elements similar to those in the first embodiment disposed in one direction to face the laser beam sources of the image forming unit 71 with one-to-one correspondence. The laser beam sources of the image forming unit 71 and the vector beam forming elements of the vector beam forming unit 23 constitute a light source unit according to the invention. The respective vector beams thus produced enter the scanning optical system 51.

The scanning optical system 51 receives the vector beams from the vector beam forming unit 23 as beams arranged in one direction, and supplies the vector beams in a direction crossing the arrangement direction of the vector beams (such as the direction perpendicular to the arrangement direction) for scanning to form a display image. The scanning optical system 51 includes a galvano mirror, for example.

The projector 4 in this embodiment is structured as described above.

The projector 4 having this structure can reduce speckles, and thus can display high-quality images.

Fifth Embodiment

Figure 6:
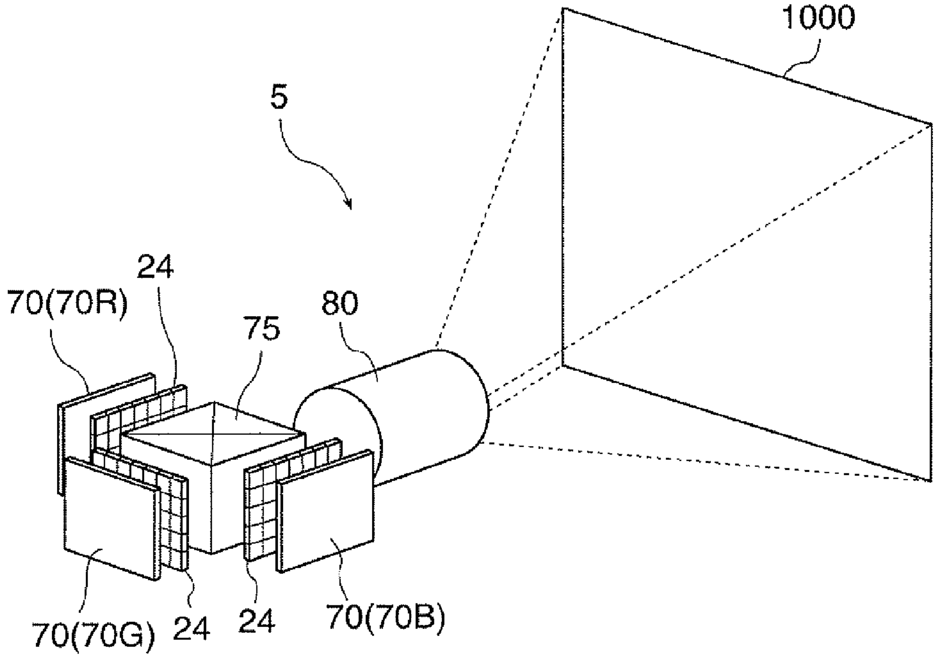
FIG. 6 is a perspective view schematically illustrating an image display apparatus according to a fifth embodiment of the invention.

FIG. 6 illustrates a projector 5 in a fifth embodiment. While the scanning-type projector has been discussed in the first through fourth embodiments, the projector 5 in this embodiment has an image forming unit containing light source units emitting vector beams in two-dimensional matrix and projects light supplied from the image forming unit to the screen to display an image. The projector 5 is now explained.

The projector 5 includes image forming units 70 (70R, 70G, 70B) each of which has laser beams disposed in two-dimensional matrix for emitting laser beams, vector beam forming units 24 each of which converts the lease beams received from the corresponding image forming unit 70 into vector beams, a dichroic prism 75 which combines the vector beams supplied from the respective vector beam forming units 24 into one light (color combining unit), and a projection lens 80 which projects the light combined by the dichroic prism 75 on the screen 1000 (projection optical system).

The image forming units 70 include an image forming unit 70R which has laser beam sources emitting red laser beams (red light) and disposed in two-dimensional matrix in correspondence with pixels constituting the image to be displayed, an image forming unit 70G which has laser beam sources emitting green laser beams (green light) and disposed in two-dimensional matrix in correspondence with pixels constituting the image to be displayed, and an image forming unit 70B which has laser beam sources emitting blue laser beams (blue light) and disposed in two-dimensional matrix in correspondence with pixels constituting the image to be displayed. Each of the image forming units 70 forms respective color components of the image to be displayed and supplies the formed color components. The respective emission lights are coherent lights having high coherence, and are supplied as substantially perfect plane waves.

The respective emission lights in red, green, and blue enter the corresponding vector beam forming units 24 to be converted into vector beams as axially symmetric polarized beams. Each of the vector beam forming units 24 contains the vector beam forming elements similar to those in the first embodiment disposed in two-dimensional matrix opposed to the laser beam sources of the image forming units 70 in one-to-one correspondence. The laser beams sources of the image forming units 70 and the vector beam forming elements of the vector beam forming units 24 constitute the light source unit according to the invention. The vector beams thus produced enter the dichroic prism 75.

The dichroic prism 75 is constituted by prisms of triangle poles affixed to one another, and includes two mirror surface provided on the inner surfaces of the dichroic prism 75 in such positions as to cross each other at right angles. One of the mirror surfaces reflects red vector beams and transmits green vector beams, and the other mirror surface reflects blue vector beams and transmits green vector beams. The red, green and blue vector beams are selectively reflected or transmitted by these mirror surfaces to be released on the same side (toward the projection lens 80). As a result, the three color lights are combined into image light. The image light is supplied to the projection lens 80 to be expanded and projected by the projection lens 80.

The projector 5 in this embodiment is structured as explained above.

The projector 5 having this structure can reduce speckles, and thus can display high-quality images.

Sixth Embodiment

Figure 7:
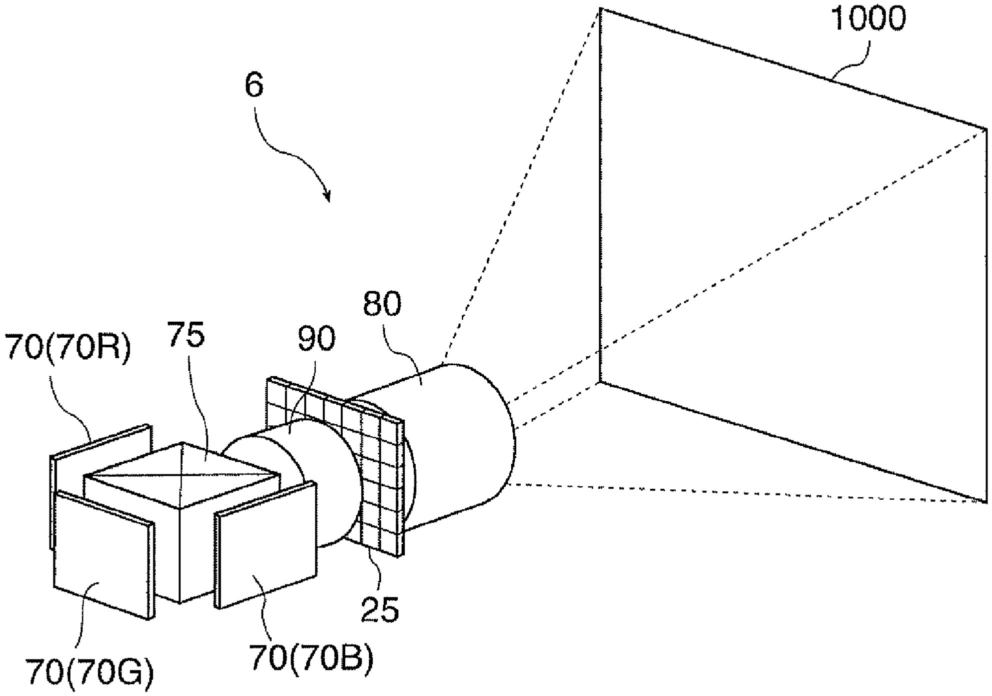
FIG. 7 is a perspective view schematically illustrating an image display apparatus according to a sixth embodiment of the invention.

FIG. 7 illustrates a projector 6 according to a sixth embodiment of the invention. The structure of the projector 6 in this embodiment is partially similar to that of the projector 5 in the fifth embodiment but is different from the projector 5 in the position of the vector beam converting unit. Thus, similar reference numbers are given to parts and elements common to those in the fifth embodiment, and the same detailed explanation is not repeated.

According to the projector 6, the laser beams in respective colors emitted from the image forming units 70R, 70G, and 70B are combined by using the dichroic prism 75 to form image light, and a vector beam forming unit 25 is disposed at a position receiving the image light thus produced. In this structure, the number of the vector beam forming unit 25 is smaller than that of the vector beam forming unit 24 in the fifth embodiment which individually converts laser beams in respective colors into vector beams. The vector beams thus produced are projected on the screen 1000 by the projection lens 80.

According to the projector 6, an expanding optical system 90 is provided on the optical path between the dichroic prism 75 and the vector beam forming unit 25 to expand the image light received from the dichroic prism 75. In this structure, the necessity for miniaturizing the vector beam forming unit 25 containing the vector beam forming elements in two-dimensional matrix is eliminated, and thus loads imposed when manufacturing the elements can be reduced.

The projector 6 having this structure can reduce speckles, and thus can display high-quality images.

Seventh Embodiment

Figure 8:
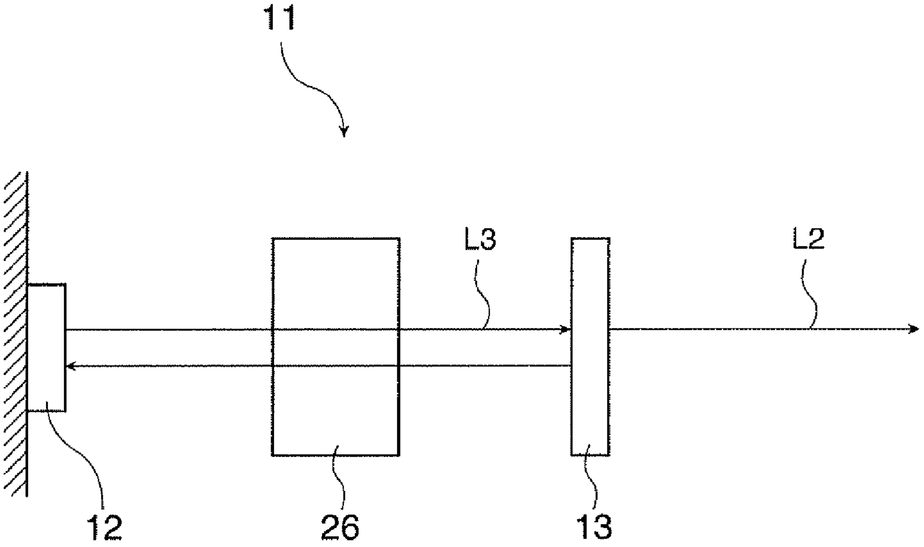
FIG. 8 shows an example of a light source unit included in an image display apparatus according to a seventh embodiment.

FIG. 8 illustrates a light source included in a projector according to a seventh embodiment of the invention. The projector in each of the first through sixth embodiments includes the light source unit which has the light sources for emitting laser beams and the vector beam converting element for converting emitted laser beams into vector beams to emit axially symmetric polarized light. However, the projector in this embodiment uses a semiconductor laser element for emitting axially symmetric polarized light as the light source unit of the invention.

FIG. 8 schematically illustrates a light source unit 11 for emitting axially symmetric polarized light. The light source unit 11 includes an emitter (light emission unit) 12 which emits light L3, an external resonance mirror (external resonator) 13 which reflects a part of the light L3 in a certain wavelength range toward the emitter 12 and transmits a part of light generated as laser beams, and a vector beam forming element 26 disposed on the optical path between the emitter 12 and the external resonance mirror 13. The vector beam forming element 26 is constituted by a Brewster prism or a double-reflection crystal, for example. The external resonance mirror 13 is constituted by a known resonance mirror.

Figure 9:
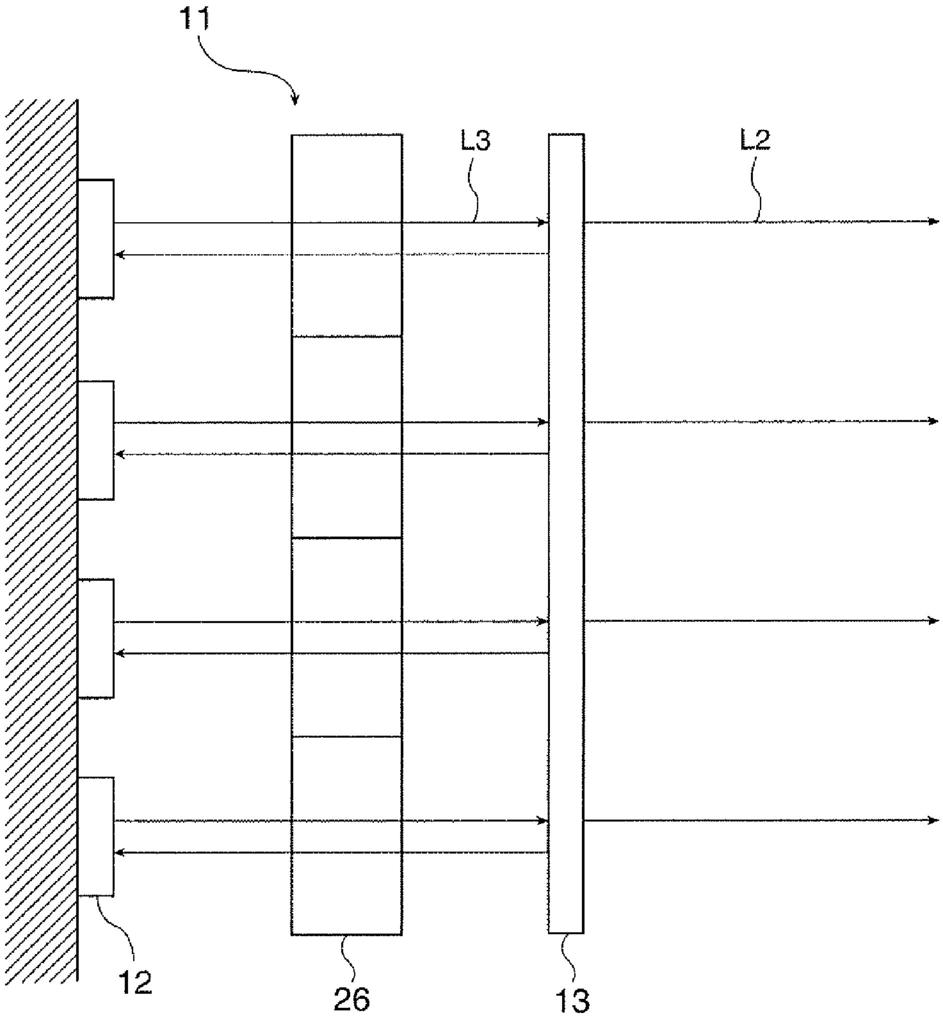
FIG. 9 shows another example of the light source unit included in the image display apparatus according to the seventh embodiment.

When the light source unit 11 has light source structure containing light sources disposed in one-dimensional or two-dimensional matrix as illustrated in FIG. 9, the vector beam forming element 26 has array structure corresponding to the positions of the respective light sources of the light source unit 11. In this case, the external resonance mirror 13 is provided as a common mirror for all the light sources of the light source unit 11.

According to the projector having this structure of the light source unit, the light source unit emits vector beams amplified by the resonance structure without requiring the vector beam forming element disposed on the optical path outside the resonator. Thus, loss of light caused in producing vector beams need not be considered. When vector beams are produced outside the resonator, for example, there is a possibility that pseudo vector beams which contain unclear boundaries between components having different polarization directions are produced. However, when polarized beams are selected inside the resonator, more perfect vector beams can be generated. Accordingly, the projector in this embodiment can reduce loss of light and use perfect vector beams for image display.

Figure 10:
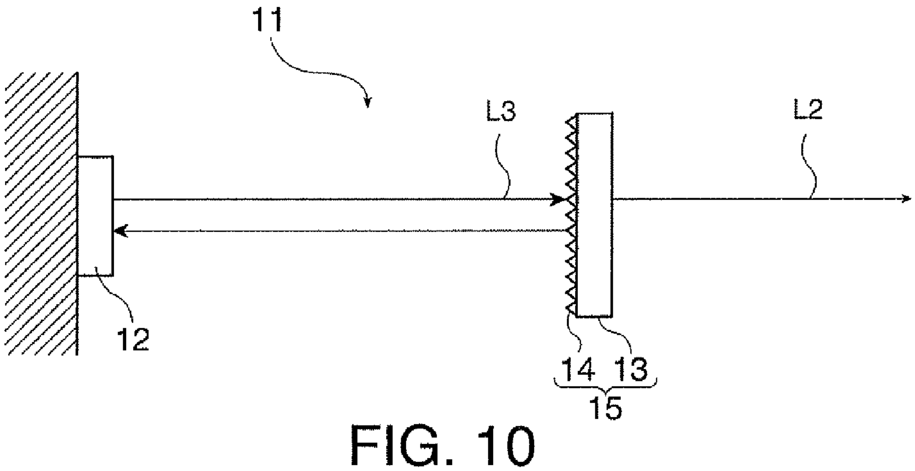
FIG. 10 shows a further example of the light source unit included in the image display apparatus according to the seventh embodiment.

According to the projector in this embodiment, the vector beam forming element and the external resonance mirror are separately provided. However, as shown in FIG. 10, a grating mirror 15 including a diffraction grating 14 on the light entrance surface of the external resonance mirror 13 may be used as an external resonance mirror functioning both as the external resonator and as the vector beam forming element. The material for forming the diffraction grating 14 may be either the same as the material of the external resonance mirror or a material different from the material of the external resonance mirror. The grating mirror 15 may be formed by processing the surface of the external resonance mirror 13 using a fine processing technique such as etching.

The light source unit containing the external resonance mirror having this structure has the external resonator and the polarized light forming unit as one unit. Thus, the system structure can be made compact, and size reduction of the projector can be achieved. Moreover, the external resonator and the vector beam forming element can be simultaneously aligned. Thus, system assembly can be facilitated.

While the preferred embodiments according to the invention have been described with reference to the attached drawings, it is obvious that the invention is not limited to these embodiments. The shapes, combinations and the like of the respective components shown in the embodiments are only examples and thus can be modified and changed according to design requirements or the like without departing from the scope and spirit of the invention.

For example, while the projector capable of displaying full-color images by using the three types of laser beam sources has been discussed in each of the first through third embodiments, the invention is applicable to a projector using monochrome light.

According to the forth embodiment, the projector 4 displays images by using the one unit of the image forming unit 71. However, the projector 4 may include a plurality of image forming units for emitting red laser beams, green laser beams, and blue laser beams, and a color combining optical system for combining the color beams emitted from the respective image forming units as in the fifth and sixth embodiments. In this case, the vector beam forming units may be disposed either before the entrance positions of the laser beams into the color combining optical system or after the exit positions of the laser beams from the color combining optical system on the optical path similarly to the fifth and sixth embodiments.

According to the fifth and sixth embodiments, the three color vector beams are emitted from the different image forming units. However, one image forming unit containing semiconductor laser elements for emitting red, green, and blue laser beams may be provided to display full-color images.

The entire disclosure of Japanese Patent Application Nos. 2009-67691, filed Mar. 19, 2009 and 2010-24767, filed Feb. 5, 2010 are expressly incorporated by reference herein.

What is claimed is:

1. An image display apparatus comprising:
   a light source unit which emits a vector beam having a non-uniform polarization distribution; and
   a scanning unit which applies the vector beam to a projection surface for scanning to form an image.

2. The image display apparatus according to claim 1, wherein the light source unit includes
   a laser beam source which emits a laser beam, and
   a polarized light forming unit disposed on the optical path of the laser beam to convert the entering laser beam into the vector beam.

3. The image display apparatus according to claim 2, wherein:
   the polarized light forming unit is a liquid crystal modulation element having a liquid crystal layer sandwiched between a pair of substrates; and
   an orientation regulating force for orienting liquid crystal molecules of the liquid crystal layer in a concentric shape is given to the surfaces of the pair of the substrates facing the liquid crystal layer.

4. The image display apparatus according to claim 2, wherein the polarized light forming unit is an optical fiber having LP11 mode as a propagation mode.

5. The image display apparatus according to claim 2, wherein:
   the polarized light forming unit is a retardation film; and
   the retardation film has a first area which converts the polarization direction of the laser beam into a first direction and a second area which converts the polarization direction of the laser beam into a second direction different from the first direction within a beam spot of the applied laser beam.

6. The image display apparatus according to claim 2, wherein the polarized light forming unit includes
   a branching unit which branches the laser beam into first separation light and second separation light,
   a light combining unit which combines the first separation light and the second separation light into one combined light, and
   a polarization element disposed at least either on the optical path of the first separation light or on the optical path of the second separation light and making the polarization directions of the first separation light the second separation light different from each other.

7. The image display apparatus according to claim 2, further comprising an expanding optical system on the optical path between the laser beam source and the polarized light forming unit.

8. The image display apparatus according to claim 1, wherein the light source unit includes a light emission unit which emits light, an external resonator which reflects a part of the light emitted from the light emission unit toward the light emission unit, and a polarized light forming unit disposed on the optical path between the light emission unit and the external resonator to convert the entering light into the vector beam.

9. The image display apparatus according to claim 1, wherein:

the light source unit includes a light emission unit which emits light, and an external resonator which reflects a part of the light emitted from the light emission unit toward the light emission unit; and the external resonator is a grating mirror which converts the entering light into the vector beam and reflects the converted light.

10. The image display apparatus according to claim 1, wherein:

the light source unit is provided;

a laser light source is provided to supply a laser beam having a color different from the color of the vector beam emitted from the light source unit;

a color combining optical system is provided to combine the vector beam and the laser beam having the different color; and the vector beam is a color light having higher visibility than that of the laser beam having the different color.

11. The image display apparatus according to claim 1, wherein:

plural units of the light source unit are provided to supply the plural vector beams having colors different from each other; and a color combining optical system is provided to combine the plural vector beams having colors different from each other.

12. The image display apparatus according to claim 2, wherein:

a plurality of laser beam sources are provided to supply plural types of laser beams having colors different from each other;

a color combining optical system is provided to combine the plural types of laser beams having colors different from each other; and the polarized light forming unit is disposed on the optical path of the combined laser beam supplied from the color combining optical system.

13. An image display apparatus comprising:

a plurality of light source units each of which emits a vector beam having a non-uniform polarization distribution, wherein the light source units are disposed in a two-dimensional matrix in correspondence with pixels forming an image to be displayed to form the image on a projection surface by using the vector beam.

14. The image display apparatus according to claim 13, wherein the light source unit includes a laser beam source which emits a laser beam, and a polarized light forming unit disposed on the optical path of the laser beam to convert the entering laser beam into the vector beam.

15. The image display apparatus according to claim 13, wherein the light source unit includes a light emission unit which emits light, an external resonator which reflects a part of the light emitted from the light emission unit toward the light emission unit, and a polarized light forming unit disposed on the optical path between the light emission unit and the external resonator to convert the entering light into the vector beam.

16. The image display apparatus according to claim 13, wherein:

the light source unit includes a light emission unit which emits light, and an external resonator which reflects a part of the light emitted from the light emission unit toward the light emission unit; and the external resonator is a grating mirror which converts the entering light into the vector beam and reflects the converted light.

17. The image display apparatus according to claim 13, wherein:

the light source unit is provided;

a laser light source is provided to supply a laser beam having a color different from the color of the vector beam emitted from the light source unit;

a color combining optical system is provided to combine the vector beam and the laser beam having the different color; and the vector beam is a color light having higher visibility than that of the laser beam having the different color.

18. The image display apparatus according to claim 13, wherein:

plural units of the light source unit are provided to supply the plural vector beams having colors different from each other; and a color combining optical system is provided to combine the plural vector beams having colors different from each other.

19. The image display apparatus according to claim 14, wherein:

a plurality of laser beam sources are provided to supply plural types of laser beams having colors different from each other;

a color combining optical system is provided to combine the plural types of laser beams having colors different from each other; and the polarized light forming unit is disposed on the optical path of the combined laser beam supplied from the color combining optical system.

* * * * *